United States Patent
Pack et al.

(10) Patent No.: US 10,003,954 B2
(45) Date of Patent: Jun. 19, 2018

(54) METHOD AND APPARATUS FOR DISTRIBUTIVE MOBILITY MANAGEMENT

(71) Applicants: Samsung Electronics Co., Ltd., Gyeonggi-do (KR); Korea University Research and Business Foundation, Seoul (KR)

(72) Inventors: Sang-Heon Pack, Seoul (KR); Han-Eul Ko, Gyeonggi-do (KR); Gi-Won Lee, Seoul (KR); Ki-Suk Kweon, Gyeonggi-do (KR); Jung-Shin Park, Seoul (KR)

(73) Assignees: SAMSUNG ELECTRONICS CO., LTD., Suwon-si (KR); Korea University Research and Business Foundation, Seoul (KR)

(*) Notice: Subject to any disclaimer, the term of this patent is extended or adjusted under 35 U.S.C. 154(b) by 0 days. days.

(21) Appl. No.: 15/025,248

(22) PCT Filed: Sep. 23, 2014

(86) PCT No.: PCT/KR2014/008811
§ 371 (c)(1),
(2) Date: Mar. 25, 2016

(87) PCT Pub. No.: WO2015/046851
PCT Pub. Date: Apr. 2, 2015

(65) Prior Publication Data
US 2016/0219426 A1    Jul. 28, 2016

(30) Foreign Application Priority Data
Sep. 25, 2013  (KR) .................. 10-2013-0113679

(51) Int. Cl.
*H04W 8/08* (2009.01)
*H04L 5/00* (2006.01)
*H04W 80/04* (2009.01)

(52) U.S. Cl.
CPC ............ *H04W 8/08* (2013.01); *H04L 5/0055* (2013.01); *H04W 80/04* (2013.01)

(58) Field of Classification Search
CPC .............................. H04W 8/08; H04L 5/0055
See application file for complete search history.

(56) References Cited

U.S. PATENT DOCUMENTS

2003/0005036 A1* 1/2003 Mitzenmacher .... H04L 67/2852
 709/203
2007/0234324 A1* 10/2007 Ananthakrishnan ......................
 H04L 67/1095
 717/151

(Continued)

FOREIGN PATENT DOCUMENTS

KR    10-2011-0071442 A    6/2011
KR    10-2012-0059166 A    6/2012
KR    10-2013-0037034 A    4/2013

OTHER PUBLICATIONS

International Search Report dated Dec. 15, 2014 in connection with International Application No. PCT/KR2014/008811; 5 pages.

(Continued)

*Primary Examiner* — Vladimir Magloire
*Assistant Examiner* — Ernest Tacsik (57) ABSTRACT

The present invention relates to a method and an apparatus for managing the mobility of a terminal in a mobile agent according to a method for distributive mobility management, and the method according to one embodiment of the present invention comprises: a step for detecting a change in location information of a terminal according to the movement of the terminal and storing the changed location information in a first storage unit; a step for storing, in a (Continued)

second storage unit, an index of the first storage unit in which the changed location information is stored; and a step for transmitting, to another mobile agent, an index value stored in the second storage unit at a point in time at which a predetermined condition is satisfied, and initializing the second storage unit.

18 Claims, 8 Drawing Sheets

(56) References Cited

U.S. PATENT DOCUMENTS

| | | | |
|---|---|---|---|
| 2009/0238112 A1* | 9/2009 | Hong | H04L 67/18 370/328 |
| 2010/0177698 A1 | 7/2010 | Salmela et al. | |
| 2010/0183018 A1* | 7/2010 | Nikander | H04L 45/02 370/401 |
| 2011/0013526 A1* | 1/2011 | Mosko | H04W 72/085 370/252 |
| 2013/0089018 A1 | 4/2013 | Kim et al. | |
| 2013/0150072 A1* | 6/2013 | Kapoor | H04W 68/04 455/456.1 |

OTHER PUBLICATIONS

Written Opinion of the International Searching Authority dated Dec. 15, 2014 in connection with International Application No. PCT/KR2014/008811; 8 pages.

Ko, et al.; "Reducing Signaling Overhead in Distributed Mobility Management via Bloom Filter"; IEEE InfoCom 2013; Turin, Italy; Apr. 14, 2013; 2 pages.

Yuen, et al.; "A Contention-Free Mobility Management Scheme Based on Probabilistic Paging"; IEEE Vehicular Tech Society; vol. 50, Issue 1; Jan. 2001; 12 pages.

Kim, et al.; "Comparative Study of Centralized Mobility Management and Distributed Mobility Management on ID/Locator Separation Architectures"; GC Wkshps; Dec. 2012; 7 pages.

* cited by examiner

FIG.10

METHOD AND APPARATUS FOR DISTRIBUTIVE MOBILITY MANAGEMENT

CROSS-REFERENCE TO RELATED APPLICATIONS AND CLAIM OF PRIORITY

The present application claims priority under 35 U.S.C. § 365 to International Patent Application No. PCT/KR2014/008811 filed Sep. 23, 2014, entitled "METHOD AND APPARATUS FOR DISTRIBUTIVE MOBILITY MANAGEMENT", and, through International Patent Application No. PCT/KR2014/008811, to Korean Patent Application No. 10-2013-0113679 filed Sep. 25, 2013, each of which are incorporated herein by reference into the present disclosure as if fully set forth herein.

TECHNICAL FIELD

The present invention relates to distributed mobility management in a communication system.

BACKGROUND

Along with the recent proliferation of smartphones, the increasing popularity of social networking services such as Facebook, Twitter, and the like, and the rapid increase of mobile Internet traffic, mobile communication service providers have made efforts to handle the trend. Since it is expected that demands for mobile Internet traffic will increase every year in view of the popularity of smartphone-based large-capacity multimedia applications, mobility management for efficiently processing mobile traffic will attract more and more interest. The present Internet mobility control techniques are characterized by centralization based on a hierarchical network structure, which makes it difficult to satisfy the ever-increasing demands for mobile Internet traffic with these techniques. In this context, distributed mobility management (DMM) is under international standardization in the Internet Engineering Task Force (IETF).

In the DMM scheme, there are a plurality of mobile agents (MAs) that manage a mobile node (MN) and thus the MAs should share location information about the MN. For this purpose, broadcasting/multicasting may be used, that is, each of all MAs may query the other MAs about the location of the MN. However, the multicasting increases unnecessary traffic. In another method, a query request may be routed to a specific MA using a distributed hash table (DHT). Despite the benefit of reduced traffic compared to the multicasting scheme, a delay time for processing a query request is increased and an additional overlay network for using the DHT should be configured, thereby increasing complexity. Also, if there are a large number of MNs, location information about the MNs is frequently changed due to movement of the MNs, resulting in the increase of query requests. As a consequence, both the schemes are not viable in processing traffic which is generated to share location information about an MN between MAs.

An object of the present invention devised to solve the conventional problem is to provide a method and apparatus for reducing traffic generated to share location information about an MN between MAs, while minimizing complexity.

SUMMARY

In an aspect of the present invention, a method for managing mobility of a mobile node according to a distributed mobility management scheme by a mobile agent includes sensing a change in location information about the mobile node along with movement of the mobile node, and storing the changed location information in a first storage, storing, in a second storage, an index of the first storage at which the changed location information is stored, and transmitting the index stored in the second storage to other mobile agents at a time of satisfying a predetermined condition, and initializing the second storage.

In another aspect of the present invention, an apparatus for managing mobility of a mobile node according to a distributed mobility management scheme includes a transceiver for sensing a change in location information about the mobile node along with movement of the mobile node, a first storage for storing the changed location information, a second storage for storing an index of the first storage at which the changed location information is stored, and a controller for transmitting the index stored in the second storage to other mobile agents at a time of satisfying a predetermined condition, and initializing the second storage.

DETAILED DESCRIPTION

Embodiments of the present invention will be described in detail with reference to the attached drawings. A detailed description of known functions or constructions will be omitted lest it should obscure the subject matter of the present invention. Terms used herein are defined in consideration of functions according to the present invention and may be changed according to the intention of a user or an operator or customs. Therefore, the definition should be made based on the comprehensive contents of the present specification.

An embodiment of the present invention provides a method for sharing location information about a mobile node (MN) between mobile agents (MAs), with lower complexity and less traffic in distributed mobility management. For this purpose, each MA manages a list of MNs managed by the MA in a bloom filter (BF), sets a timer for periodically sharing location information about an MN, and indicates a changed index of the BF to other MAs each time the timer expires in an embodiment of the present invention. A BF is a probabilistic data structure used to test whether an element is a member of a set. The BF is advantageous in that a large amount of data is stored reduced and data can be fast detected. While a BF is used to store location information about an MN in an embodiment of the present invention, by way of example, the present invention is not limited thereto. Thus, other data structures similar to a BF are also available.

Figure 1:
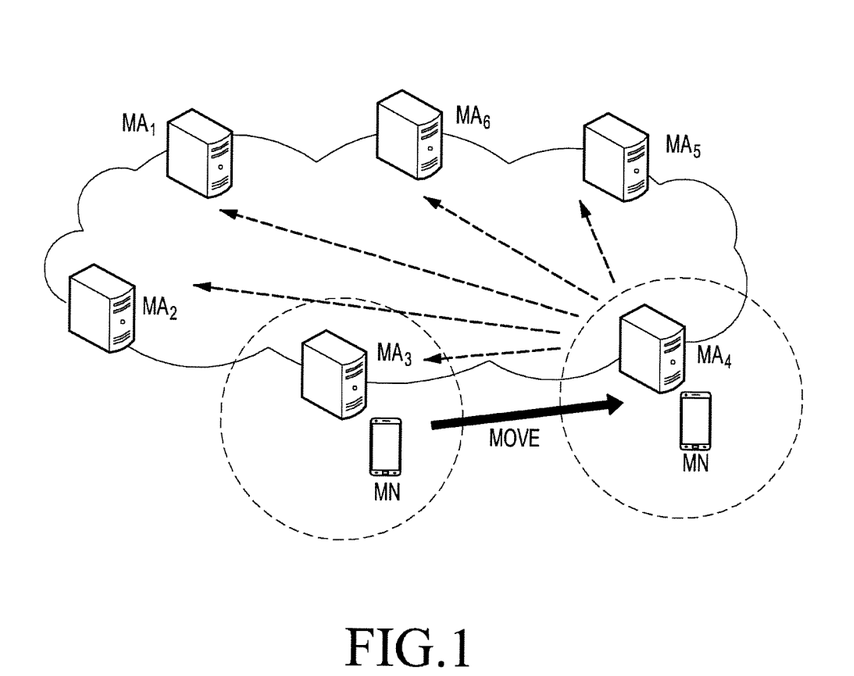
FIG. 1 illustrates a system configuration for distributed mobility management according to an embodiment of the present invention.

FIG. 1 illustrates a system configuration for distributed mobility management according to an embodiment of the present invention.

Referring to FIG. 1, a plurality of MAs, $MA_1$ to $MA_6$ manage location information about an MN separately. Each MA has a timer for adjusting a period of sharing the location information about the MN, and a BF for storing and managing the location information about the MN. In FIG. 1, if the MN moves from the coverage area of $MA_3$ to the coverage area of $MA_4$, $MA_4$ updates and stores the location information about the MN in its managed BF, and stores the updated location information in a separate storage (hereinafter, referred to as an index storage). Subsequently, upon expiration of its managed timer, $MA_4$ transmits the location information about the MN stored in the index storage to the other MAs. As information changed during running the timer is transmitted at once upon expiration of the timer in this manner, rather than each time location information is updated, traffic required for sharing location information may be reduced.

Figure 2:
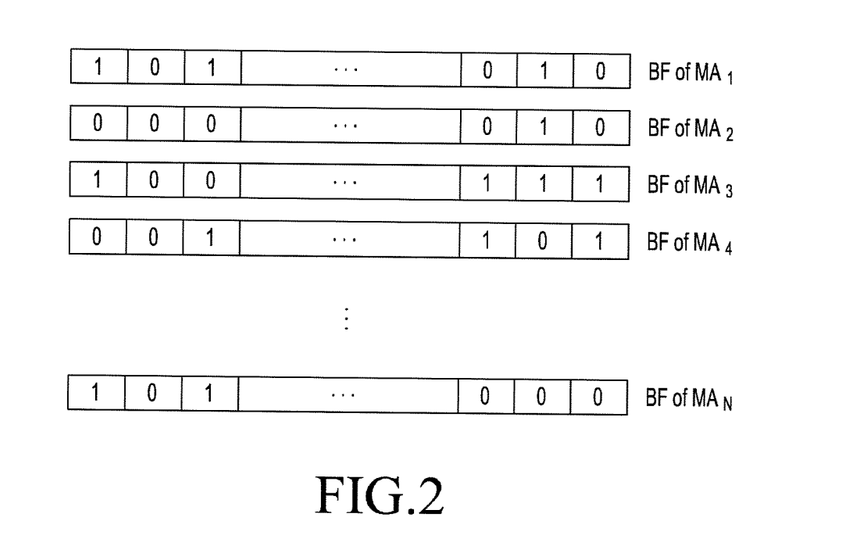
FIG. 2 illustrates configurations of bloom filters (BFs) managed by each mobile agent (MA) according to an embodiment of the present invention.

FIG. 2 illustrates configurations of BFs managed by each MA according to an embodiment of the present invention.

Referring to FIG. 2, a BF has an m-bit long bit array structure, and uses k (k is a natural number equal to or larger than 1) different hash functions. Each hash function outputs m values (hash values) with an equal probability with respect to an input value. In an embodiment of the present invention, an identifier (ID) of an MN is an input value for the hash functions, and mobility information about the MN is managed by changing bit values of the BF corresponding to output values of the hash functions. That is, upon sensing movement of an MN into an area managed by an MA, the MA changes bit values at indexes of a BF corresponding to output values of k hash functions using the ID of the MN as an input value from 1s to 0s. This operation may reduce unnecessary transmission of the location information about the MN.

Figure 3:
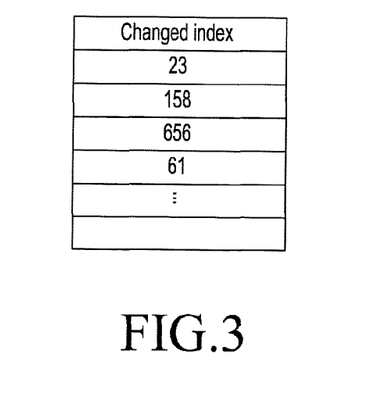
FIG. 3 illustrates an index storage according to an embodiment of the present invention.

FIG. 3 illustrates an index storage according to an embodiment of the present invention.

The index storage is used to store indexes of a BF with changed bit values. As described above, if an MN moves to the coverage area of an MA, the MA stores location information about the MN by changing bit values stored at indexes of a BF corresponding to output values of hash functions with respect to the ID of the MN. Herein, the indexes of the BF having the changed bit values are also stored in an index storage. In FIG. 3, it is noted that bit values corresponding to indexes of a BF, 23, 158, 656, 61, . . . have been changed. The indexes stored in the index storage are transmitted to other MAs upon expiration of a timer and then the index storage is empty. The MA may have as many index storages as the other MAs except for the MA and manage the index storages on an MA basis. With use of the index storage, the MA transmits only changed index values, thus reducing traffic compared to transmission of a whole BF to other MAs.

Figure 4:
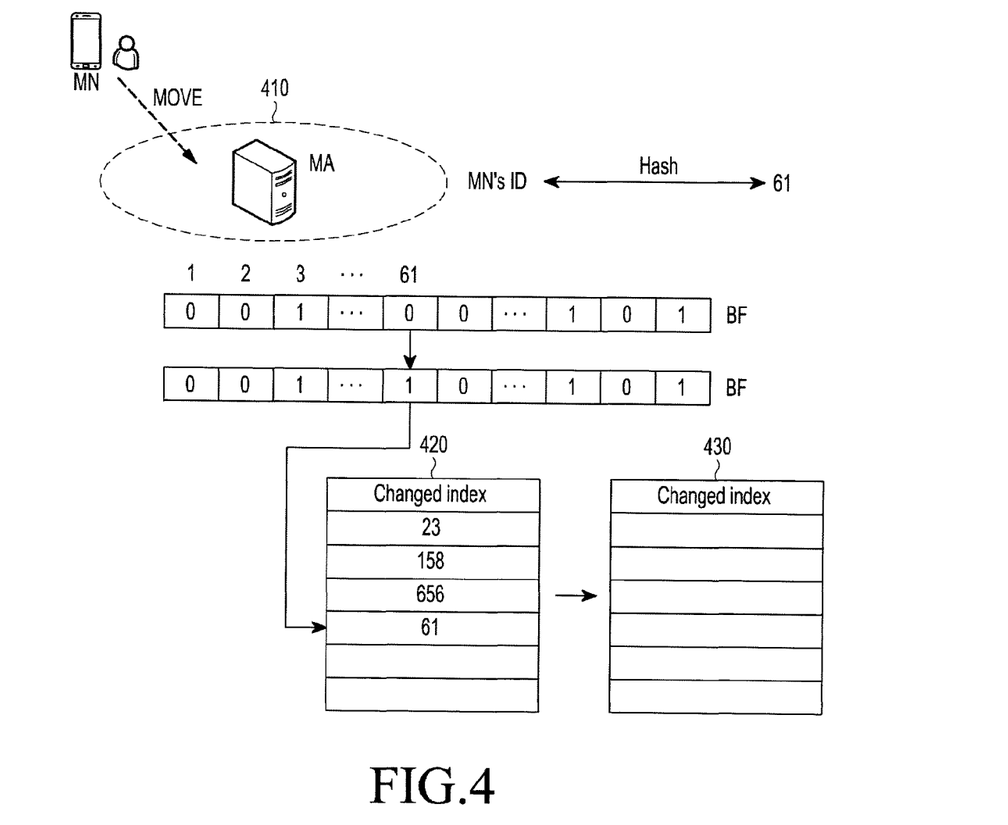
FIG. 4 illustrates a process for storing location information about a mobile node (MN) in a BF by an MA according to an embodiment of the present invention.

FIG. 4 illustrates a process for storing location information about an MN in a BF by an MA according to an embodiment of the present invention.

When the MN enters the coverage area 410 of the MA, the MA sets bit values at indexes of a BF corresponding to output values of k hash functions for the input of an ID of the MN to 1s. The indexes of the BF with bit values changed by the output values of the hash functions are stored in an index storage 420. For the convenience of description, it is assumed that one hash function is used in FIG. 4. For the input of the ID of the MN to the hash function, the output value of the hash function is 61. Therefore, a bit value corresponding to index 61 of the BF is changed from 0 to 1. Further, index 61 of the BF with the changed bit value is stored in the index storage 420. 23, 158, and 656 and 61 stored before 61 are indexes of the BF sequentially representing location information about the MN, which has been changed during running of a timer set to share location information about the MN between MAs. Subsequently, upon expiration of the timer or upon receipt of a location information request message for sharing location information from another MA, the MA transmits the indexes stored in the index storage 420 to the other MAs and initializes the index storage, as indicated by reference numeral 430.

If the MA is to locate the MN, the MA may search for an MA which the MN is located by checking BFs that the MA has. If location information about the MN that the MA currently has is not accurate, the MA may update the location information about the MN by transmitting a location information request message to other MAs.

Figure 5:
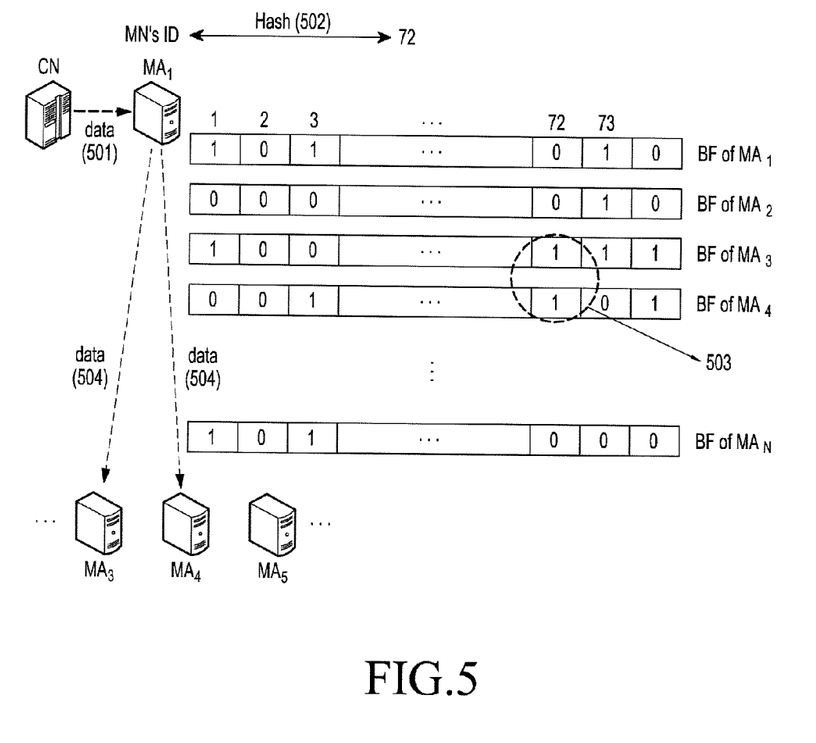
FIG. 5 illustrates an operation for transmitting data to an MN by a correspondent node (CN) according to an embodiment of the present invention.

FIG. 5 illustrates an operation for transmitting data to an MN by a CN according to an embodiment of the present invention.

If a CN requests data transmission to an MN to $MA_1$ in operation 501, the MN obtains a hash value by a hash function used for a BF for the input of the ID of the MN in operation 502. In the example of FIG. 5, the hash value is 72. $MA_1$ checks bit values corresponding to index 72 in BFs for respective MAs and determines MAs having bit value 1 at index 72 in operation 503. Bit value 1 at index 72 in a BF means that the MN is located in the area of an MA corresponding to the BF. However, false positive matches are possible in the nature of a BF that stores a large amount of information in a small space. In FIG. 5, bit values at index 72 in BFs for $MA_3$ and $MA_4$ are set to 1s. Thus, $MA_1$ transmits data to $MA_3$ and $MA_4$ operation 504. In the case of a false positive match, location information about the MN stored in the BFs of $MA_3$ and $MA_4$ may be wrong. In other words, the MN may not be located in the areas of $MA_3$ and $MA_4$. Then, upon receipt of the data, $MA_3$ and $MA_4$ may transmit negative acknowledgement (NACK) messages to $MA_1$. Accordingly, $MA_1$ may transmit a location information request message to all other MAs to determine accurate location information about the MN.

Figure 6:
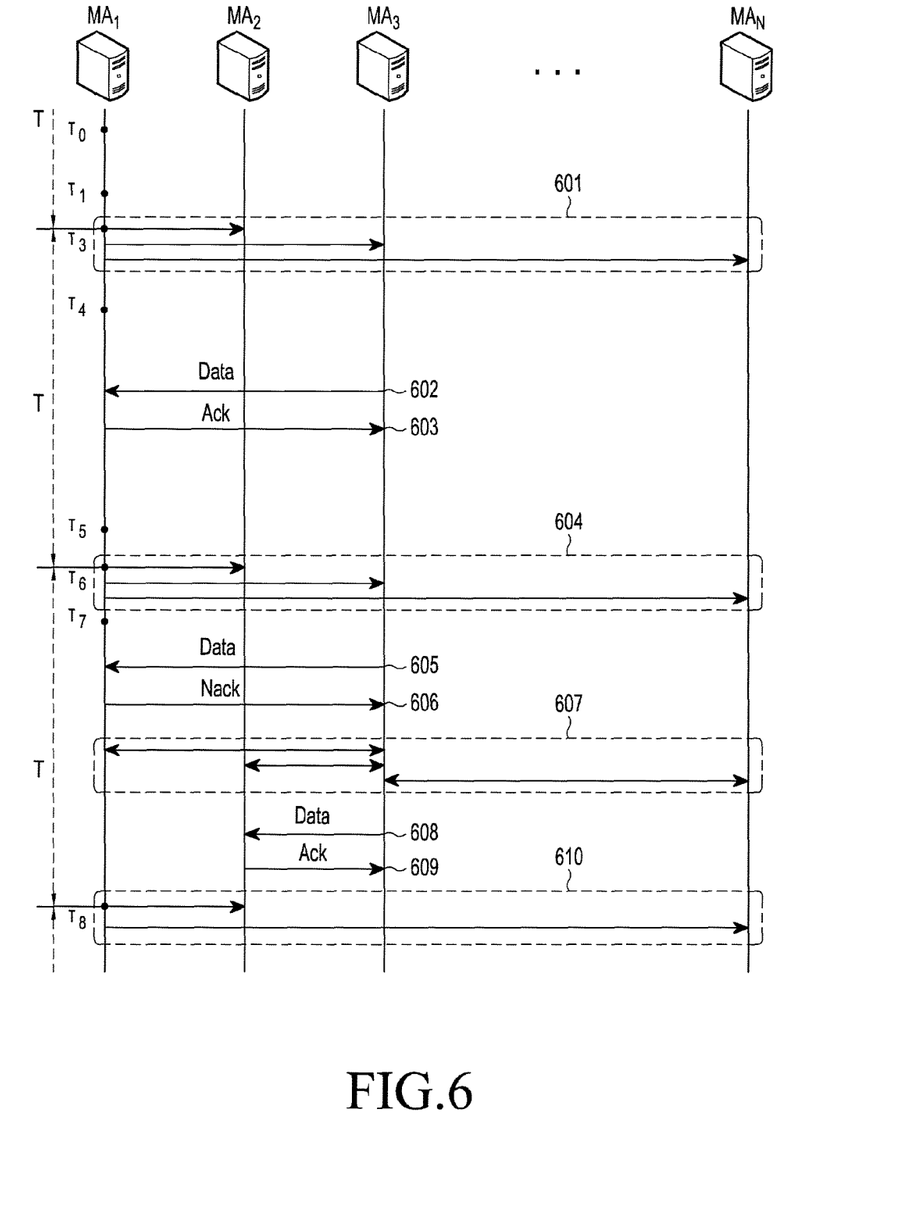
FIG. 6 illustrates an operation for sharing location information about an MN between MAs and transmitting data received from a CN to another MA by $MA_1$ according to an embodiment of the present invention.

FIG. 6 illustrates an operation for sharing location information about an MN between MAs and transmitting data received from a CN to another MA by $MA_1$ according to an embodiment of the present invention.

In FIG. 6, T represents a timer for determining a time at which $MA_1$ is to transmit location information about an MN, and $\tau_k$ represents a time at which the MN enters the coverage area of $MA_1$ or moves from the coverage area of $MA_1$ to another MA, or a time at which the timer expires in $MA_1$. Upon expiration of the timer at time $\tau_3$, $MA_1$ transmits location information about MNs that have entered the coverage area of $MA_1$ before time $\tau_3$ (that is, $\tau_1$ and $\tau_2$) to the other MAs in operation 601. The transmitted location information is indexes of the BF stored in the index storage, as described before.

If an MN within the coverage area of $MA_1$ stays in the coverage area of $MA_1$ after the update of the BF of $MA_1$, when the CN connected to $MA_3$ transmits data to the MN, the data may be delivered successfully to the MN because $MA_3$ has correct location information about the MN. That is, $MA_3$ transmits data to $MA_1$ in operation 602 and $MA_1$ transmits an ACK message to $MA_3$ in operation 603.

Upon expiration of the timer at time $\tau_6$ at a second time, $MA_1$ transmits location information about an MN that has entered the coverage area of $MA_1$ at a time between $\tau_3$ and $\tau_6$ (that is, time $\tau_4$ and time $\tau_5$) to the other MAs in operation 604. If an MN moves from the coverage area of $MA_1$ to the coverage area of $MA_2$ at time $\tau_7$ after the BF update in $MA_1$, the BF of $MA_1$ is not updated until expiration of the timer in $MA_1$. Also, the timer of $MA_2$ does not expire after time $\tau_7$ and thus a BF for $MA_2$ is not updated either. If a CN connected to $MA_3$ requests data transmission to the MN in this state, data may not be transmitted successfully to the MN because $MA_3$ does not have correct location information about the MN. That is, upon receipt of data from the CN, $MA_3$ determines that the MN is located in the coverage area of $MA_1$ by checking its BFs and thus transmits the data received from the CN to $MA_1$ in operation 605. However, since the MN is not located in the coverage area of $MA_1$, $MA_1$ may not transmit the data to the MN and thus transmits a NACK message to $MA_3$ in operation 606. Then $MA_3$ may be aware that location information in its BFs is wrong, from the NACK message. Therefore, $MA_3$ transmits a location information request message for the MN to the other MAs, receives location information from the other MAs, and updates its BFs in operation 607. During this operation, $MA_2$ may transmit location information indicating the presence of the MN in its coverage area to $MA_3$ and $MA_3$ may determine that the MN is located in the coverage area of $MA_2$ based on the updated BFs. Accordingly, $MA_3$ transmits the data received from the CN to $MA_2$ in operation 608, and $MA_2$ transmits an ACK message to $MA_3$ in operation 609. Upon expiration of the timer again at time $\tau_8$, $MA_1$ transmits location information about an MN that has entered its coverage area at a time between $\tau_6$ and $\tau_8$ to the other MAs in operation 610. Although $MA_3$ has location information about MNs in $MA_1$ in operation 607, the other MAs except for $MA_3$ do not have the latest location information about the MNs. Accordingly, each time the timer expires, $MA_1$ needs to transmit location information to the other MAs. For this purpose, each MA may manage an index storage on an MA basis. That is, the index storages for $MA_3$ among the index storages managed by the MAs including $MA_1$ is empty through operation 607. Therefore, upon expiration of the timer at time $\tau_8$, $MA_1$ does not have location information to transmit to $MA_3$, and transmits location information stored in the index storage to each of the other MAs except for $MA_3$ in operation 610.

Figure 7:
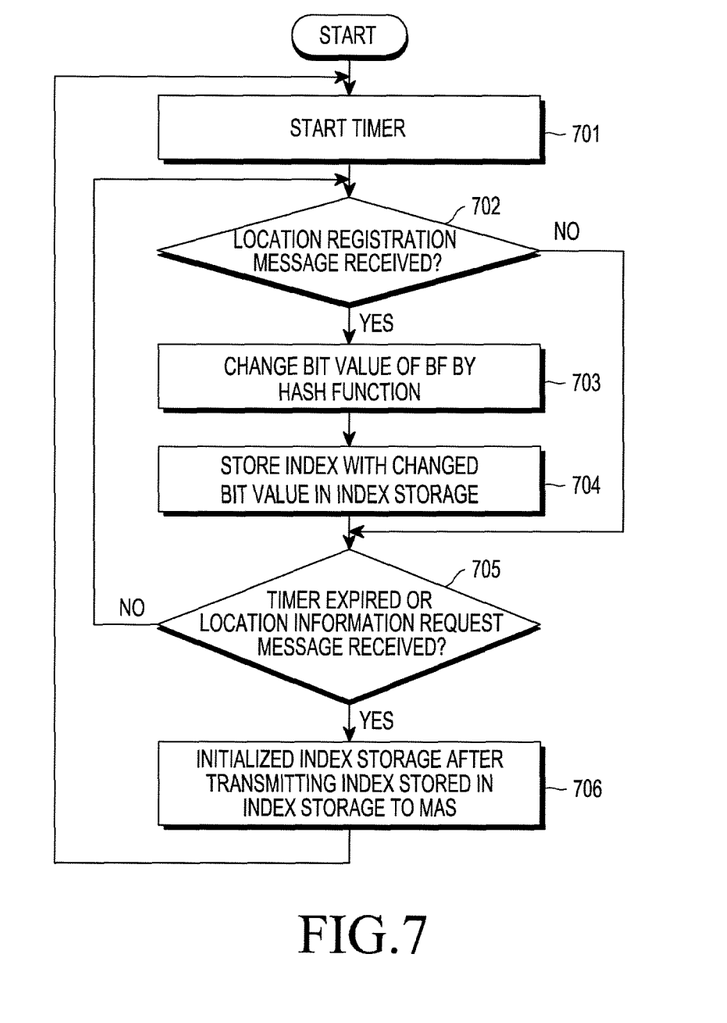
FIG. 7 is a flowchart illustrating an operation for updating a BF and transmitting location information about an MN to other MAs by an MA according to an embodiment of the present invention.

FIG. 7 is a flowchart illustrating an operation for updating a BF and transmitting location information about an MN to other MAs by an MA according to an embodiment of the present invention.

Referring to FIG. 7, upon expiration of a timer set to a predetermined value for location information transmission or upon receipt of a location information request message from another MA, the MA starts or restarts the timer in operation 701. Upon receipt of a location registration message due to movement of an MN during running the timer in operation 702, the MA obtains a hash value using the ID of the MN included in the location registration message and a hash function and changes a bit value at an index of a BF corresponding to the hash value to 1 in operation 703. Also, the MA stores the index of the BF with the changed bit value in an index storage in operation 704. Subsequently, upon expiration of the timer or upon receipt of a location information request message from another MA in operation 705, the MA transmits index values stored in the index storage to other MAs and empties the index storage in operation 706. The MA then starts the timer again in operation 701. Further, the other MAs which have received the index values update the BFs of the MA managed by the other MAs based on the received index values.

Figure 8:
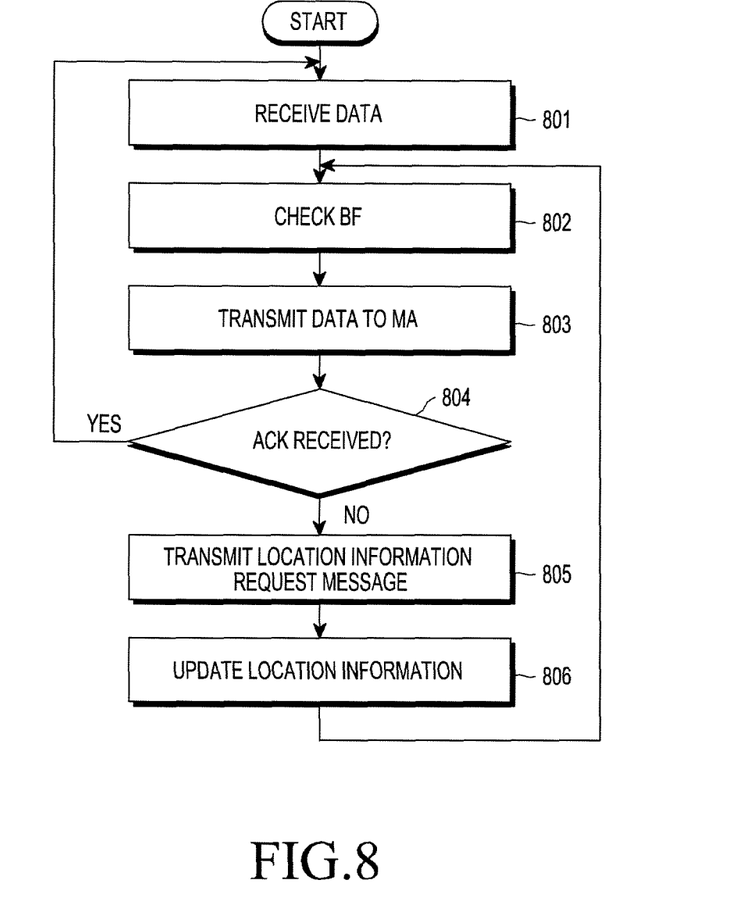
FIG. 8 is a flowchart illustrating an operation of an MA, when the MA receives data from another MA according to an embodiment of the present invention.

FIG. 8 is a flowchart illustrating an operation of an MA, when the MA receives data from another MA according to an embodiment of the present invention.

Referring to FIG. 8, upon receipt of data from a CN in operation 801, the MA obtains a hash function using the ID of an MN to receive the data and a hash function. The MA checks bit values at an index of BFs for MAs managed by the MA corresponding to the hash value in operation 802. In operation 803, the MA transmits the data to the MA(s) having bit value 1 at the index. Subsequently, upon receipt of an ACK message indicating successful transmission of the data to the MN from another MA in operation 804, the MA waits until receiving next data. On the other hand, upon receipt of a NACK message from the other MA(s), the MA transmits a location information request message to the other MAs in operation 805, and updates the BFs that the MA has by receiving response messages in operation 806. The MA rechecks the updated BFs in operation 802 and transmits the data to an MA in which the MN is located in operation 803. After receiving an ACK message from the MA in operation 804, the MA waits until receiving next data. The operation of FIG. 8 is repeated each time data is received.

Figure 9A:
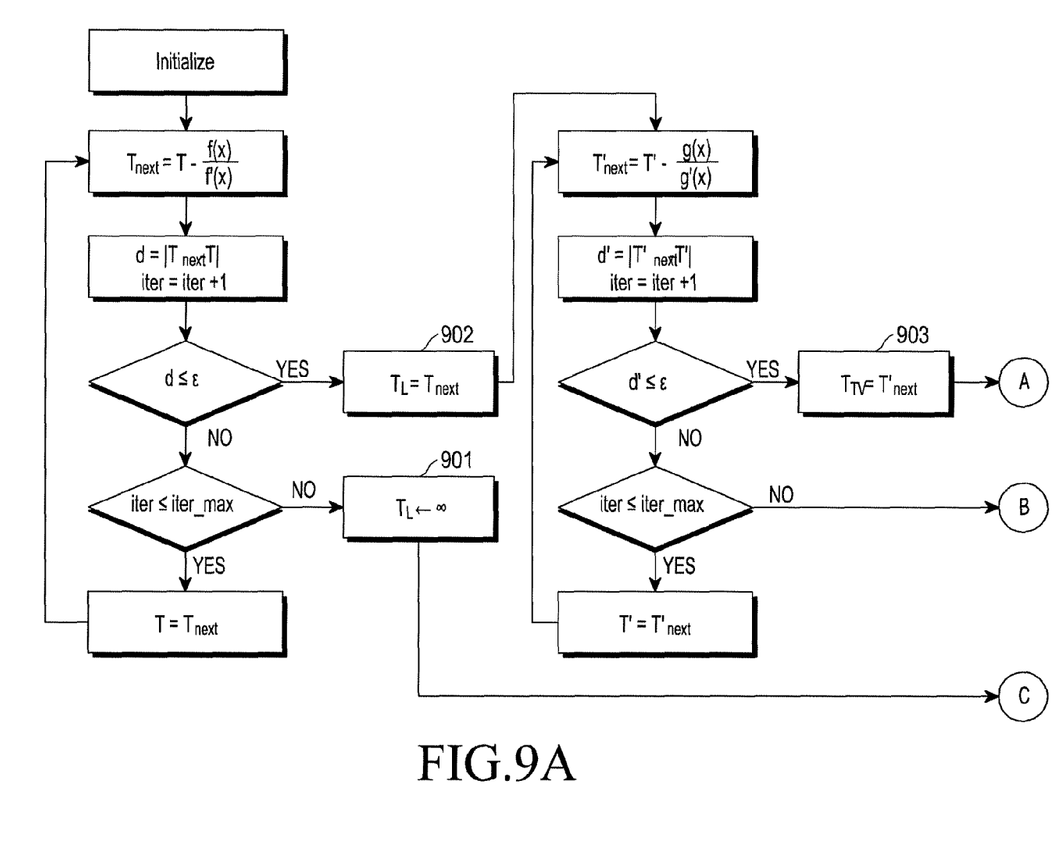
FIGS. 9A and 9B illustrate an exemplary algorithm for determining an optimum timer value according to a Newton's method.
Figure 9B:
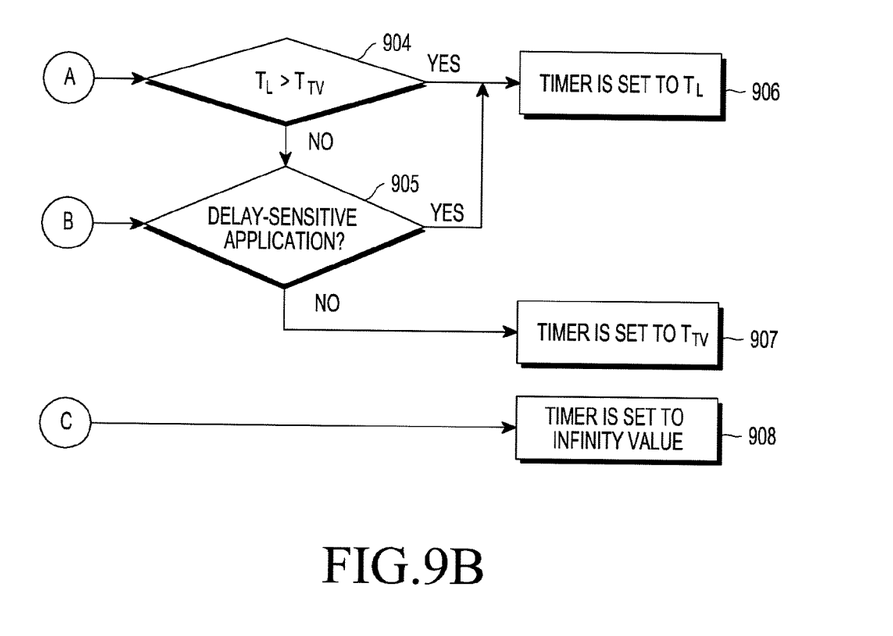

Meanwhile, since an MA transmits location information to other MAs each time a timer expires in the embodiment of the present invention, an algorithm for setting an optimum timer value is needed. FIGS. 9A and 9B illustrate an exemplary algorithm for setting an optimum timer value according to a Newton's method. However, the present invention is not limited to the specific algorithm and a timer value may be set in any other method.

As described before in relation to the background art, DHT-based distributed mobility management causes less traffic, while ensuring an almost equal delay time, compared to the multicasting-based scheme. Accordingly, the timer value setting algorithm according to the embodiment of the present invention selects a timer value causing less traffic, while ensuring a delay time that may be observed in the DHT-based distributed mobility management scheme.

In FIG. 9A, f(x) represents an equation having, as a solution, a timer value that results in a delay time equal to a delay time that may be achieved in the DHT-based distributed mobility distribution scheme, and the timer value is denoted by $T_L$. g(x) is an equation having, as a solution, a timer value which results in an amount of traffic for transmission of location information equal to the amount of traffic that may be achieved in the DHT-based distributed mobility distribution scheme, and the timer value is denoted by $T_{TV}$. f(x) and g(x) may be acquired by mathematical modeling. For this purpose, the number of MAs, the number of updates of location information about MNs received per second by an MA, the number of data (packets) transmitted to an MN per second, and the distance (the number of hops)

between MAs are needed. That is, a timer value is set appropriately according to the situation of each MA.

In FIG. 9A, reference numeral 901 denotes a case in which the solution of f(x) may not be obtained in the Newton's method. That is, this means that there is no point at which the delay time of location information update according to the embodiment of the present invention becomes equal to the delay time in the DHT-based distributed mobility distribution scheme. As a timer value increases, a delay time also increases in the embodiment of the present invention. Therefore, even though the timer value is set to an infinite value, the delay time of the present invention is shorter than the delay time in the DHT-based distributed mobility distribution scheme. On the other hand, as the timer value increases, the amount of traffic involved in location information update decreases in the embodiment of the present invention. Accordingly, in the case where there is no timer value that makes the delay time of the present invention equal to the delay time the DHT-based distributed mobility distribution scheme, it is preferable to set the timer value to an infinite value to reduce the amount of traffic as much as possible, as indicated by reference numeral 908.

On the contrary, in the presence of a timer value that makes the delay time of the present invention equal to the delay time in the DHT-based distributed mobility distribution scheme in operation 902, a point at which the amount of traffic for transmission of location information according to the embodiment of the present invention becomes equal to the amount of traffic that may be achieved in the DHT-based distributed mobility distribution scheme is acquired. In the presence of a point at which the amount of traffic for transmission of location information according to the embodiment of the present invention becomes equal to the amount of traffic that may be achieved in the DHT-based distributed mobility distribution scheme in operation 903, $T_L$ is compared with $T_{TV}$ in operation 904. As described above, because the amount of traffic and a delay time involved in location information update according to the embodiment of the present invention decreases and increases with a timer value, respectively, if $T_L > T_{TV}$, the higher value $T_L$ is set as a timer value in operation 906. In other words, less traffic than in the DHT-based distributed mobility distribution scheme may be achieved, while a time delay equal to a time delay in the DHT-based distributed mobility distribution scheme is achieved. If $T_L < T_{TV}$ or there is no point that results in equal traffic amounts, a timer value is set in such a manner that a delay time or a traffic amount may be equal to a delay time or a traffic amount in the DHT-based distributed mobility distribution scheme, in consideration of the characteristics of transmission packet data (for example, an application or the like) in operation 905. That is, in the case of delay-sensitive packet data such as voice over Internet protocol (VoIP) data, the timer value is set to the smaller value between $T_L$ and $T_{TV}$, that is, $T_L$ in operation 906. For packet data insensitive to delay, the timer value is set to the larger value between $T_L$ and $T_{TV}$, that is, $T_{TV}$ in operation 907.

Figure 10:
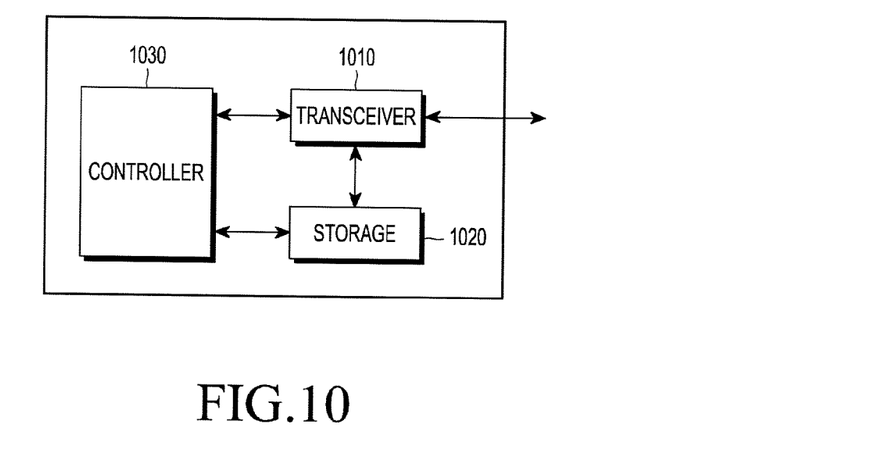
FIG. 10 is a block diagram of an MA according to an embodiment of the present invention.

FIG. 10 is a block diagram of an MA according to an embodiment of the present invention.

Referring to FIG. 10, the MA includes a transceiver 1010, a storage 1020, and a controller 1030. The transceiver 1010 receives data from a CN, transmits data to an MN, receives location information from another MA, and transmits location information about an MN managed by the MA to the other MAs in the method according to the embodiment of the present invention. Further, the transceiver 1010 transmits and receives an ACK/NACK message in relation to data transmission and reception. The storage 1020 includes index storages for storing updated BFs of MAs and indexes of a BF with changed bit values in the method according to the embodiment of the present invention. The controller 1030 controls operations of the transceiver 1010 and the storage 1020, and sets a timer value appropriately to transmit location information according to the embodiment of the present invention.

While each MA transmits location information to the other MAs upon expiration of a timer in the method for sharing location information between MAs according to the embodiment of the present invention, the present invention is not limited thereto, and location information may be shared between MAs according to other conditions. For example, it may be contemplated that when location information is changed as many times as a predetermined number, an MA transmits the location information to the other MAs, or when location information is changed as many times as a predetermined number before expiration of a timer, which means that both the number of changing location information and the timer are considered at once, the MA transmits the location information to the other MAs. The number of changes in location information may be determined based on the number of receiving a location registration message or the number of indexes stored in an index storage. Also, it may be determined whether to share updated location information at a time of updating the location information in an optimization method such as a Markov decision process (MDP) model and the location information may be transmitted according to the determination.

According to the embodiment of the present invention as described above, an MA has a timer and transmits information updated for a predetermined time to the other MAs at once, using the timer, rather than the MA shares location information about an MN immediately each time the MN moves. That is, instead of transmitting location information about a new MN to the other MAs each time the new MN enters the coverage area of the MA, the MA shares location information about MNs with the other MAs only upon expiration of the timer managed by the MA. Consequently, traffic required to maintain/manage location information can be reduced.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:
1. A method for managing mobility of a mobile node according to a distributed mobility management scheme by a mobile agent, the method comprising:
   sensing at least one change in location information about the mobile node during running a timer, and storing the changed location information in a first storage;
   storing, in a second storage, at least one index of the first storage at which the at least one changed location information is stored; and
   transmitting the at least one index corresponding to the at least one change sensed during running the timer to other mobile agents at a time of satisfying a predetermined condition and initializing the second storage,
   wherein the time of satisfying the predetermined condition is a time when a timer set to a predetermined value expires, the predetermined value greater than a time value for the sensing of the at least one change in the location information.

2. The method of claim 1, wherein the sensing of a change in location information comprises sensing a change in the location information about the mobile node by receiving a location registration message from the mobile node along with a movement of the mobile node.

3. The method of claim 1, wherein the first storage is a bloom filter managed on a mobile agent basis.

4. The method of claim 3, wherein the storing of the changed location information in a first storage comprises:
 acquiring hash function values for input of an identifier of the mobile node using at least one predetermined hash function; and
 changing bit values at indexes of the first storage corresponding to the hash function values to a predetermined value.

5. The method of claim 1, further comprising:
 receiving an index from at least one of the other mobile agents, and updating location information of the at least one mobile agent stored in the first storage based on the received index;
 receiving data from another mobile node;
 determining a location of the mobile node to receive the data by checking the updated location information; and
 transmitting the data to a mobile agent to which the mobile node to receive the data belongs.

6. The method of claim 5, further comprising:
 receiving a negative acknowledgement (NACK) message from the mobile agent to which the mobile node to receive the data belongs;
 transmitting a location information request message to the other mobile agents;
 receiving indexes from the other mobile agents and updating location information of the other mobile agents stored in the first storage based on the received indexes;
 locating the mobile node to receive the data by checking the updated location information of the other mobile agents; and
 transmitting the data to the mobile agent to which the mobile node to receive the data belongs.

7. The method of claim 6, wherein the first storage is a bloom filter managed on a mobile agent basis, and the updating of location information of the other mobile agents stored in the first storage comprises changing bit values at the received indexes in bloom filters for the other mobile agents stored in the first storage to a predetermined value.

8. The method of claim 7, wherein the determining a location of the mobile node to receive the data comprises:
 acquiring hash function values for input of an identifier of the mobile node to receive the data using at least one predetermined hash function; and
 determining a mobile agent with bit values at indexes of the first storage corresponding to the hash function values set to a predetermined value to be the mobile agent to which the mobile node to receive the data belongs.

9. The method of claim 1, wherein the second storage is managed on a mobile agent basis.

10. An apparatus for managing mobility of a mobile node of a distributed mobility management scheme, the apparatus comprising:
 a transceiver configured to communicate with other mobile agents; and
 a controller coupled with the transceiver and configured to:
  sense at least one change in location information about the mobile node during running a timer, and store the at least one changed location information in a first storage;
  store, in a second storage, at least one index of the first storage at which the at least one changed location information is stored; and
  transmit the at least one index corresponding to the at least one change sensed during running the timer to other mobile agents at a time of satisfying a predetermined condition and initializing the second storage,
 wherein the time of satisfying the predetermined condition is a time when a timer set to a predetermined value expires, the predetermined value greater than a time value for the sensing of the at least one change in the location information.

11. The apparatus of claim 10, wherein the controller further configured to sense the change in the location information about the mobile node by receiving a location registration message from the mobile node along with a movement of the mobile node.

12. The apparatus of claim 10, wherein the first storage is a bloom filter managed on a mobile agent basis.

13. The apparatus of claim 12, wherein the controller further configured to:
 acquire hash function values for input of an identifier of the mobile node using at least one predetermined hash function, and
 change bit values at indexes of the first storage corresponding to the hash function values to a predetermined value.

14. The apparatus of claim 10, wherein the controller further configured to:
 receive an index from at least one of the other mobile agents,
 receive data from another mobile node,
 transmit the data to a mobile agent to which a mobile node to receive the data belongs,
 update location information of the at least one mobile agent stored in the first storage based on the received index, and
 determine a location of the mobile node to receive the data by checking the updated location information.

15. The apparatus of claim 14, wherein the controller further configured to:
 receive a negative acknowledgement (NACK) message from the mobile agent to which the mobile node to receive the data belongs,
 transmit a location information request message to the other mobile agents,
 receive indexes from the other mobile agents,
 transmit the data to the mobile agent to which the mobile node to receive the data belongs,
 update location information of the other mobile agents stored in the first storage based on the received indexes, and
 locate the mobile node to receive the data by checking the updated location information of the other mobile agents.

16. The apparatus of claim 15, wherein the first storage is a bloom filter managed on a mobile agent basis, and the controller updates the location information of the other mobile agents stored in the first storage by changing bit values at the received indexes in bloom filters for the other mobile agents stored in the first storage to a predetermined value.

17. The apparatus of claim 16, wherein the controller further configured to:
    acquire hash function values for input of an identifier of the mobile node to receive the data using at least one predetermined hash function, and
    determine a mobile agent with bit values at indexes of the first storage corresponding to the hash function values set to a predetermined value to be the mobile agent to which the mobile node to receive the data belongs.

18. The apparatus of claim 10, wherein the second storage is managed on a mobile agent basis.

* * * * *